INVENTOR
PIERRE ANDRE CHOMBARD
BY Mawhinney & Mawhinney
ATTYS

May 3, 1960 P. A. CHOMBARD 2,934,962
DEVICE FOR SUSPENDING THE ACTION OF BALL-TYPE
ERECTORS OF VERTICAL SPIN AXIS GYROSCOPES
Filed April 24, 1958 2 Sheets-Sheet 2

INVENTOR
PIERRE ANDRE CHOMBARD
BY Mawhinney & Mawhinney
ATTYS.

2,934,962

DEVICE FOR SUSPENDING THE ACTION OF BALL-TYPE ERECTORS OF VERTICAL SPIN AXIS GYROSCOPES

Pierre André Chombard, Boulogne-sur-Seine, France, assignor to Etat Francais, as represented by the Secretary of State for Armed Forces (Air), Paris, France Application April 24, 1958, Serial No. 730,619

Claims priority, application France April 30, 1957

5 Claims. (Cl. 74—5.44)

The present invention relates to a device for discontinuing the action of ball-type erectors of vertical spin axis gyroscopes.

It is known that vertical spin axis gyroscopes make use of an erecting system which is sensitive to the direction of the apparent vertical, which produces a precession of the gyroscope so that its axis permanently tends to come into alignment with the said apparent vertical. This system ensures a fairly satisfactory vertical, as long as accelerations, other than gravity, to which the aircraft is submitted, do not have a very long duration, in the course of which the axis of the gyroscope may deviate substantially from the vertical. It is of course impossible to conceive a device capable of foreseeing the actual duration of an acceleration and of suppressing the effect of the erector in relation of this forecast. However, in practice, accelerations of a lasting nature, other than gravity, occurring for example when the aircraft turns or when it gathers speed after take-off or slows down on being airbraked, are sufficiently high to deflect the apparent vertical by a substantial angle, and can therefore be signalled when said angle exceeds an empirically predetermined value.

Thus, when the axis of the gyroscope has been brought to the vertical before taking-off, by the action of the erecting device while the aircraft was still immobile, it can be assumed that if a device carried by the gyroscope and sensitive to the accelerations perpendicular or substantially perpendicular to the spin axis thereof, whatever their azimuth orientation, suppresses the effect of the erector when said accelerations exceed a preselected compromise value, the causes of the most serious errors will thus be eliminated and the effect on the quality of the vertical provided by the axis of the gyroscope will be beneficial.

The object of the present invention is to provide a device of the aforesaid kind used in connection with rotary ball-type erectors, of a known design.

It is known that in such systems, the erecting balls, in variable numbers, are pushed on a plane circular track, which is perpendicular or substantially perpendicular to the axis of the gyroscope, by means of pusher-rods secured to a rotary unit. When the plane of the track is perpendicular to the apparent vertical, the motion of these balls is uniform and has substantially no influence on the position of the spin axis of the gyroscope. When this is not the case, each ball urged by the acceleration component which is parallel to the plane of the track, is accelerated and is detached from its pusher-rod during one part of each circular course; it is the dissymmetrical action of the apparent gravity of the balls during each turn which produces the erecting couple.

This device for suspending the action of ball-type erectors of vertical spin axis gyroscopes is essentially characterised by a detector of accelerations parallel to the plane of the track, associated to each ball of the erector, and means for immobilising the corresponding ball when said accelerations reach a predetermined value.

According to a first embodiment, each detector of accelerations parallel to the plane of the track comprises a pendulum, the axis of which, being supported by the rotary unit of the erector of the vertical spin axis gyroscope, is parallel to the plane of the track and substantially perpendicular to the diametral plane of the ball containing the normal axis of the track, the ball being against its pusher-rod; and the means for immobilising the ball, corresponding to each pendulum, comprise a lever oscillating with said pendulum, the free end of said lever abutting the ball on an area beneath its center and immobilising it as soon as accelerations parallel to the plane of the track reach a predetermined value.

According to a second embodiment, the free end of the lever oscillating with the pendulum carries a small plate by means of which it abuts the ball at a point substantially at the level of the center thereof.

This invention will be better understood on reading the following description of one embodiment of the device according to the invention, said description bringing out further features and advantages thereof in reference to the accompanying drawings, in which.

Figure 1:
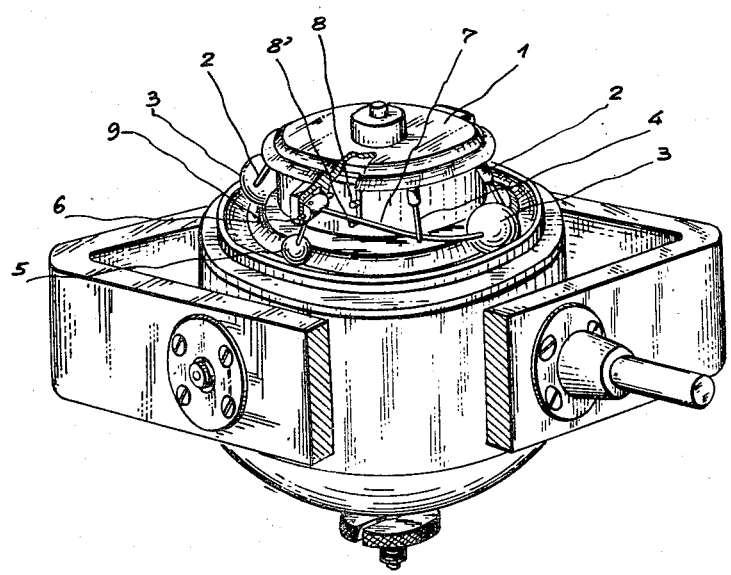
Figures 1 and 2 are perspective views of a vertical spin axis gyroscope, provided with a two ball-erector, said balls being held in Figure 1 and free in Figure 2.
Figure 2:
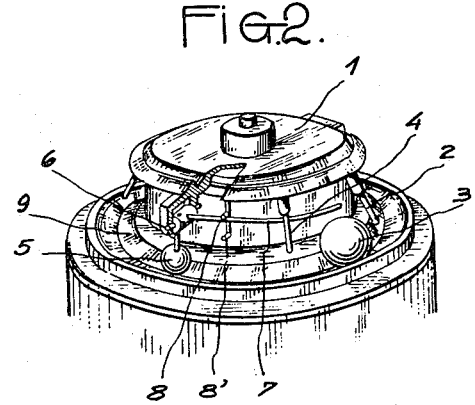

The rotary plate 1 of the vertical spin axis gyroscope carries, on the one hand, the pusher-rods 2 which cause balls 3 to circulate on the track 9, and on the other hand, stop-members 4 which limit their course.

With each ball 3 is associated a pendulum 5 integral with a lever 7, oscillating about a spindle 6 which is parallel to the plane of the circular track 9 and is supported by the rotary plate 1. Two stop-members 8 and 8', also integral with said rotary plate, limit the upward and downward movement of the lever 7. When this lever abuts the upper stop-member 8, the corresponding ball 3 is free between its pusher-rod 2 and its stop-member 4, and when it abuts the lower member 8', the corresponding ball is held between its pusher-rod 2 and the end of the lever 7, the contact between the end of lever 7 and ball 3 taking place at a point located below the center of the latter. In the last mentioned position, the diametral plane of the ball passing through the normal axis of the track is substantially perpendicular to the spindle 6 of the pendulum 5. This condition defines the direction of the spindle 6.

Figure 3:
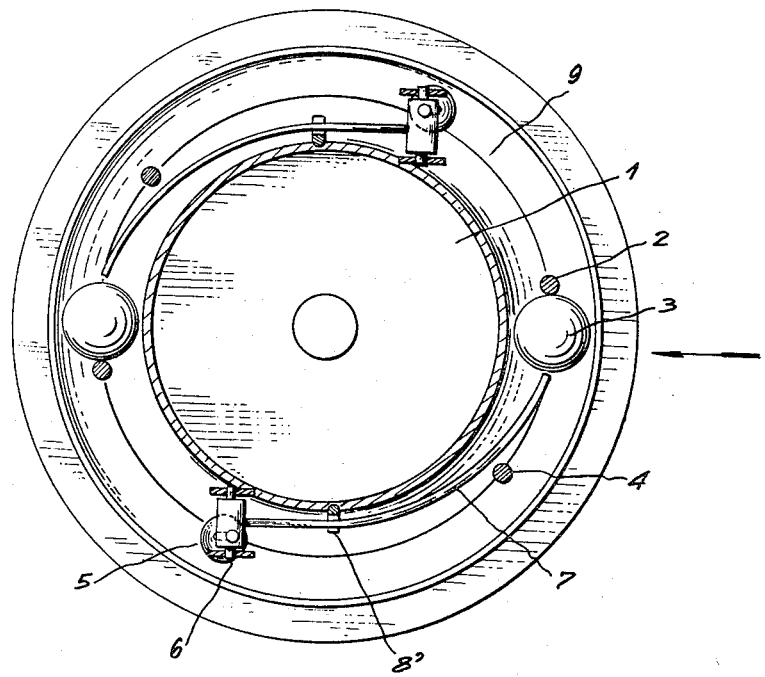
Figure 3 is a horizontal sectional view of the gyroscope taken along a plane passing through the pendulum-axes.
Figure 4:
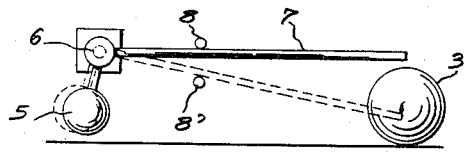
Figure 4 is a front view of the pendulum and of its lever, the corresponding ball being free.

The operation of the device according to the invention is as follows:

When the acceleration component, parallel to the plane of the track, is directed as shown by the arrow $f$ (see Figure 3), i.e. in a substantially perpendicular direction to the spindle 6 of the corresponding pendulum, the lever 7 rocks about this spindle 6. If said component exceeds a certain predetermined value, the lever 7 abuts the stop-member 8', and the erector ball 3 is held between its pusher-rod 2 and the end of the lever 7.

As the rotation of the erecting assembly continues, the amplitude of the shift of the pendulum 5 tends to decrease, the end of the lever 7 thus being urged upwards. But the latter is held in its lowermost position by the ball 3, which reacts to the acceleration and "overlaps" said lever-end. This lever 7 is freed only when the ball is no longer tangentially urged by the acceleration component, parallel to the plane of the track, i.e. when the ball reaches a position which is substantially diametrically opposed to its initial position.

From this new position, the pendulum 5 is urged in the opposite direction. The end of the lever 7 leaves the ball and the lever 7 bears against the upper stop-member 8. But the ball is by now held against its pusher-rod by the acceleration component until it passes again through its original position.

Thus, the ball has not left its pusher-rod during a full rotation of the erector. The erecting effect has therefore been actually suppressed.

Figure 5:
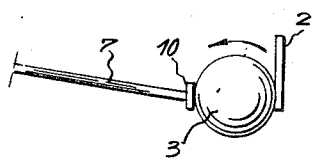
Figure 5 is an alternative embodiment of the lever end integral with the pendulum.

In the alternative embodiment shown in Figure 5, the end of the lever 7 carries a small plate 10. In the lower position of the lever 7, this plate is tangent to the ball 3 along a plane, which is substantially perpendicular to the rolling track, and the ball is thus again held between the pusher-rod and said plate.

When the lever 7 tends to rise, so long as the ball bears against plate 10, the ball remains nevertheless immobilised, in view of the direction of rotation thereof and of the resulting frictional engagement at the point of contact with the plate, this tending to hold the lever 7 on the lower stop-member 8'.

If the acceleration component, parallel to the plane of the track, is lower than the preselected value from which the erection ceases to take place, the lever 7 does not bear against the stop-member 8', but its end comes into frictional engagement with the ball, and this ball in order that it may roll, has to raise the lever 7. The resulting braking of the ball does not cause any alteration of the erecting properties, but on the contrary, it produces an improvement due to the fact that the dissymmetry of the ball-motions comes nearer to an optimum value, which provides a resulting weight at 90° from the plane of deviation of the apparent vertical. Under such conditions, it becomes possible to stabilise the gyroscopic assembly so that its center of gravity shall coincide with the center of suspension, which also results in an elimination of the disturbances of the spin axis of the gyroscope by torques caused by the effects of accelerations on the mass of the gyroscope.

In practice, it is not imperative that the locking of all balls should be carried out for the same deflection angle from the apparent vertical. It can even be advantageous to effect a successive locking of the balls for different values of said angle so as to avoid a sudden passing from normal erection to the total suppression of this erection.

In order to vary the value of the acceleration component, parallel to the plane of the track, from which the erection is suspended, it is sufficient to shift the spindle 6 of pendulum 5 in a direction parallel to itself and to adjust accordingly the length of lever 7 and the position of stop-members 8 and 8'.

The instrument can be advantageously completed by the provision of a quick-resetting mechanism.

It is to be understood that this invention has just been described and illustrated by way of explanation without limitation of the same, and that numerous alterations of detail can be made therein without falling outside its scope.

I claim:

1. Device for discontinuing the action of ball erectors in vertical spin axis gyroscopes, said erectors being of the type in which the balls roll on a circular track coaxial with the gyroscope spin axis, each ball being moved by a pusher-rod supported by the rotary unit of the erector and its movement being limited by an abutment also supported by the said rotary unit, characterized in that with each ball is associated a single detector of the accelerations parallel to the plane of the track of the erector and specific means for immobilizing it against the pusher-rod when the detected acceleration exceeds a predetermined value, said detector and said immobilizing means being combined in a single member formed by a pendulum supported by said rotary unit, the axis of which is parallel to the plane of the track and substantially perpendicular to the diametral plane of the corresponding ball containing the normal axis of the track, the ball being against its pusher-rod.

2. Device according to claim 1, wherein the means for immobilizing the ball corresponding to a pendulum which detects the accelerations parallel to the plane of the track, comprise a lever oscillating with said pendulum, the free end of said lever abutting the ball in an area beneath its center and holding it against its pusher-rod when said accelerations have reached a predetermined value.

3. Device according to claim 2, wherein a stop-member integral with the rotary unit limits the downward travel of the lever.

4. Device according to claim 2, wherein a stop-member integral with the rotary unit limits the upward travel of the lever, the ball moving freely when the lever bears against said stop-member.

5. Device according to claim 3, wherein the end of the lever integral with the pendulum carries a plate by means of which the lever, when bearing against its lower stop-member, pushes against the ball at a point substantially at the level of the center of said ball.

References Cited in the file of this patent
UNITED STATES PATENTS

| | | |
|---|---|---|
| 1,627,178 | Henry | May 3, 1927 |
| 2,435,090 | McClellan | Jan. 27, 1948 |
| 2,504,061 | Alkan | Apr. 11, 1950 |